(12) United States Patent
Hong et al.

(10) Patent No.: US 7,538,832 B2
(45) Date of Patent: May 26, 2009

(54) METHOD AND MODULE FOR ILLUMINATING A LIQUID CRYSTAL DISPLAY PANEL

(75) Inventors: Hee Jung Hong, Seoul (KR); Tae Ho You, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/876,723

(22) Filed: Jun. 28, 2004

(65) Prior Publication Data
US 2005/0007516 A1    Jan. 13, 2005

(30) Foreign Application Priority Data
Jul. 7, 2003 (KR) .................. 10-2003-0045694

(51) Int. Cl.
G02F 1/1335 (2006.01)
G06G 3/36 (2006.01)

(52) U.S. Cl. .............................. 349/61; 349/62; 349/64; 345/102

(58) Field of Classification Search ................. 362/555, 362/558, 561; 349/64, 62, 61; 345/102
See application file for complete search history.

(56) References Cited

U.S. PATENT DOCUMENTS

| | | | | |
|---|---|---|---|---|
| 4,929,062 A | * | 5/1990 | Guzik et al. | 349/65 |
| 5,128,783 A | * | 7/1992 | Abileah et al. | 349/162 |
| 5,325,271 A | * | 6/1994 | Hutchisson | 362/555 |
| 5,477,422 A | * | 12/1995 | Hooker et al. | 362/29 |
| 5,598,281 A | * | 1/1997 | Zimmerman et al. | 349/5 |
| 5,727,866 A | * | 3/1998 | Kraines et al. | 362/86 |
| 5,748,389 A | * | 5/1998 | Gering et al. | 359/811 |
| 6,445,373 B1 | * | 9/2002 | Yamamoto | 345/102 |
| 6,606,133 B1 | * | 8/2003 | Okabe | 349/65 |
| 6,697,042 B1 | * | 2/2004 | Cohen et al. | 345/102 |
| 6,789,921 B1 | * | 9/2004 | Deloy et al. | 362/252 |
| 6,880,947 B2 | * | 4/2005 | Hsieh et al. | 362/614 |
| 2003/0020677 A1 | | 1/2003 | Nakano | |
| 2003/0035078 A1 | * | 2/2003 | Maruyama et al. | 349/117 |
| 2004/0239829 A1 | * | 12/2004 | Yu et al. | 349/61 |
| 2005/0200773 A1 | * | 9/2005 | Chang | 349/64 |

FOREIGN PATENT DOCUMENTS

| | | |
|---|---|---|
| CN | 1144913 | 3/1997 |
| CN | 1400488 | 3/2003 |
| JP | 07-074394 | 3/1995 |
| JP | 10-133027 | 5/1998 |
| JP | 11-133423 | 5/1999 |
| JP | 2002231037 A * | 8/2002 |
| WO | WO 9110223 A1 * | 7/1991 |

\* cited by examiner

*Primary Examiner*—Mike Qi
(74) *Attorney, Agent, or Firm*—McKenna Long & Aldridge LLP (57) ABSTRACT

A liquid crystal display module includes a liquid crystal display panel, a light source for irradiating light onto the liquid crystal display panel, a diffuser for diffusing the light irradiated from the light source. A plurality of holes is provided at a rear side of the diffuser to insert a portion of the light source therein.

8 Claims, 13 Drawing Sheets

METHOD AND MODULE FOR ILLUMINATING A LIQUID CRYSTAL DISPLAY PANEL

The present invention claims the benefit of Korean Patent Application No. P2003-045694 filed in Korea on Jul. 7, 2003, which is hereby incorporated by reference.

BACKGROUND OF THE INVENTION

1. Field of the Invention

This invention relates to a liquid crystal display module, and more particularly to a liquid crystal display module and a driving method thereof that reduce the thickness and the weight of the module and improve the picture quality of the liquid crystal display.

2. Description of the Related Art

Generally, a liquid crystal display (LCD) includes a liquid crystal display module, and a driving circuitry for driving the liquid crystal display module.

The liquid crystal display module consists of a liquid crystal display panel having liquid crystal cells arranged in a matrix between two glass substrates, and a backlight unit for irradiating a light onto the liquid crystal display panel. The liquid crystal display module includes optical sheets for vertically raising a light propagating from the backlight unit toward the liquid crystal display panel.

In the related art liquid crystal display panel, the backlight unit and the optical sheets must be integrally engaged with each other to prevent loss of light, and to protect from damage caused by an external impact. To this end, the LCD panel includes a case that encloses the back light unit and the optical sheets, including the edge of the liquid crystal display panel.

Figure 1:
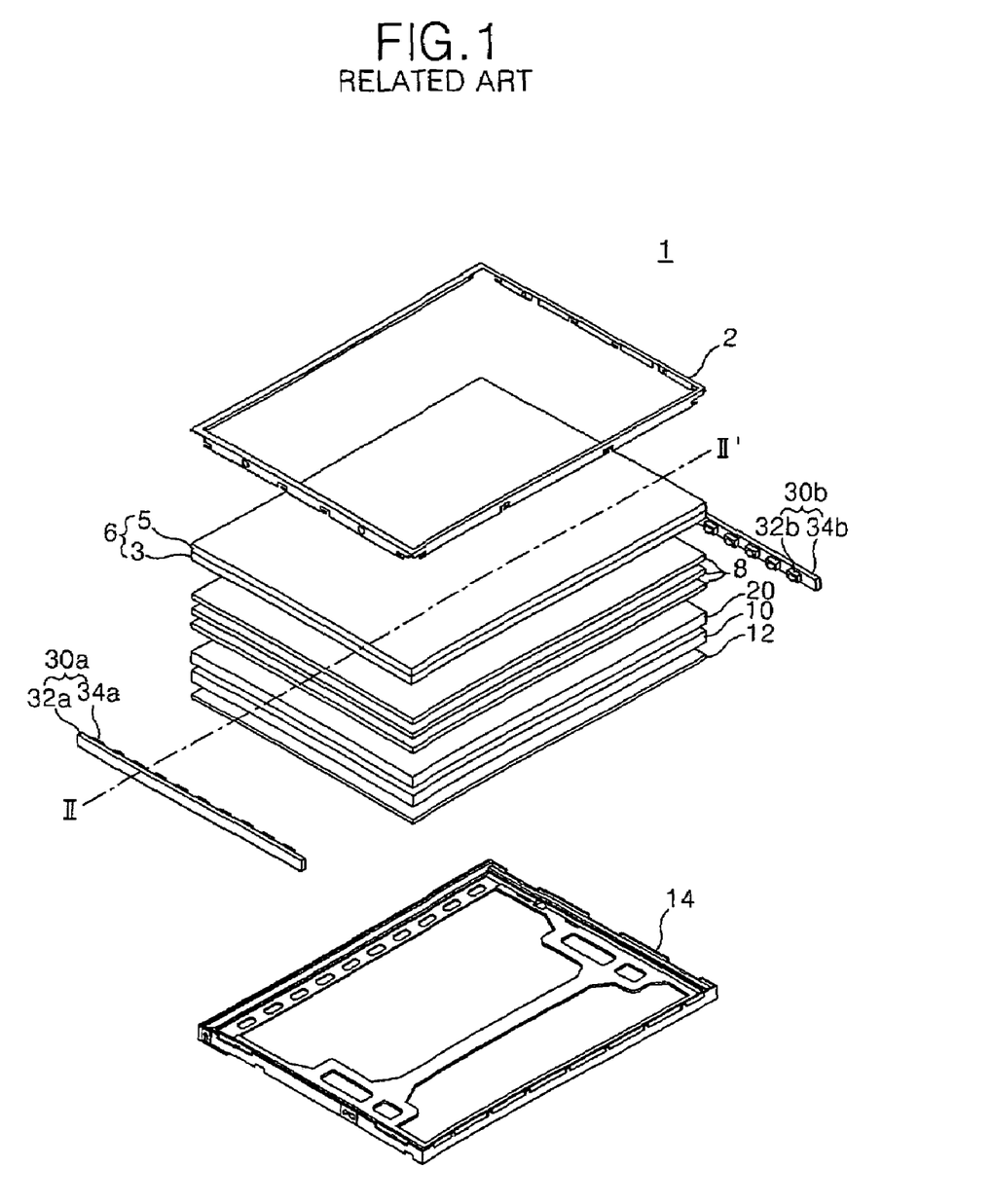
FIG. 1 is a perspective view of a structure of a liquid crystal display module according to related art.
Figure 2:
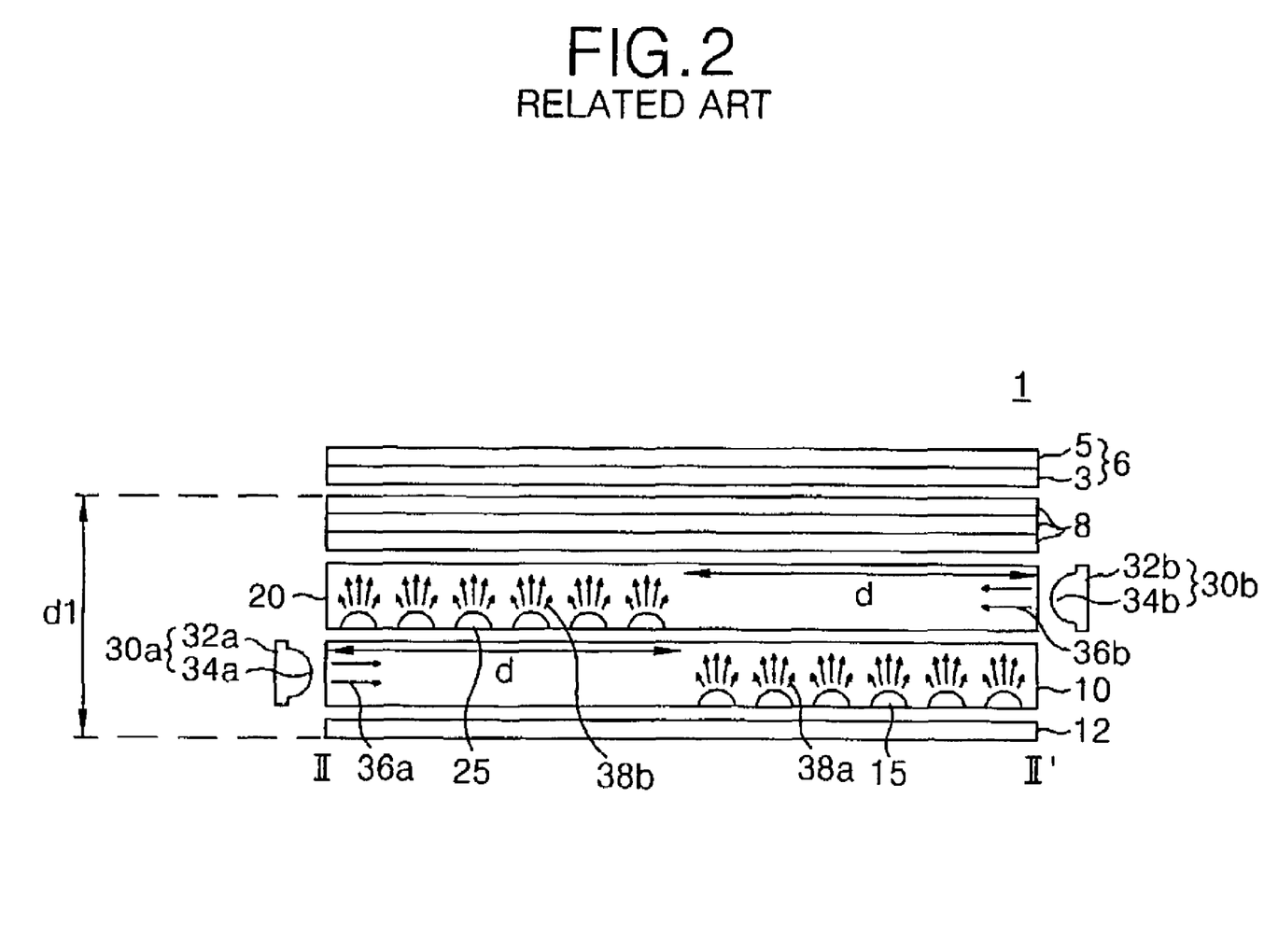
FIG. 2 is a section view of the liquid crystal display module taken along the II-II' line in FIG. 1.

FIG. 1 is a perspective view of a structure of a liquid crystal display module according to related art. FIG. 2 is a section view of the liquid crystal display module taken along the II-II' line in FIG. 1. Referring to FIG. 1 and FIG. 2, the related art liquid crystal display module 1 includes a main support 14, a backlight unit, a liquid crystal display panel 6, and a top case 2. The liquid crystal display panel 6 is disposed at the inside of the main support 14. The top case 2 encloses the edge of the liquid crystal display panel 6 and the main support 14.

A liquid crystal is injected between an upper substrate 5 and a lower substrate 3 of the liquid crystal display panel 6. The liquid crystal display panel 6 includes a spacer (not shown) to maintain a constant gap between the upper substrate 5 and the lower substrate 3. The upper substrate 5 of the liquid crystal display panel 6 is provided with a color filter, a common electrode and a black matrix, etc (not shown). A signal wiring such as a data line and a gate line, etc. (not shown) is formed at the lower substrate 3 of the liquid crystal display panel 6, and a thin film transistor (TFT) is formed at an intersection between the data line and the gate line.

The TFT switches a data signal to be transmitted from the data line into the liquid crystal cell in response to a scanning pulse (i.e., a gate pulse) from the gate line. A pixel electrode is formed at a pixel area between the data line and the gate line. One side of the lower substrate 3 includes pad areas connected to the data lines and the gate lines. A tape carrier package (not shown) is attached onto the pad area. The tape carrier package includes a driver integrated circuit for applying a driving signal to the TFT. This tape carrier package applies data signals from the driver integrated circuit to the data lines. The tape carrier package also applies scanning signals to the gate lines.

An upper polarizing sheet is attached onto the upper substrate 5 of the liquid crystal display panel 6. A lower polarizing sheet is attached onto of the rear side of the lower substrate 3 of the liquid crystal display panel 6.

The main support 14 is a molded product. An inner side wall surface of the main support is molded into a stepped coverage face. This stepped coverage face is provided with a securing part to which a plurality of optical sheets 8 is safely secured. A back light unit, first and second light guide plates 10 and 20, a reflective sheet 12, and a plurality of optical sheets 8 are disposed at the inner side layer of the main support 14. The backlight unit comprises light emitting diode (LED) arrays 30a and 30b for irradiating a light onto the liquid crystal display panel 6. The reflective sheet 12 is arranged at the rear side of the first light guide plate 10. The optical sheets 8 are disposed between the second light guide plate 20 and the liquid crystal display panel.

Figure 3:
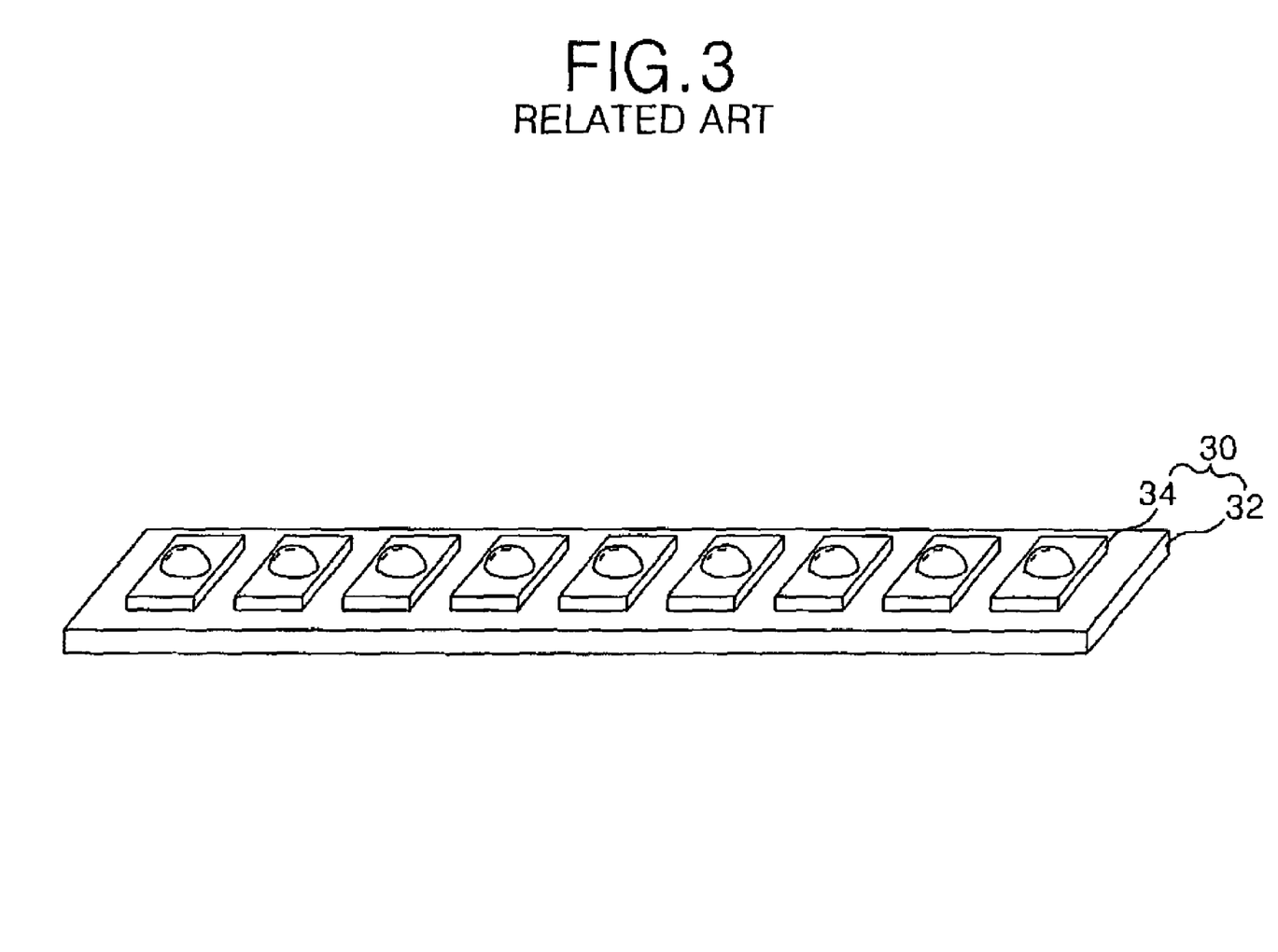
FIG. 3 is a perspective view of a general light emitting diode array.

FIG. 3 is a perspective view of a general light emitting diode array. As shown in FIG. 3, the LED array 30 of the related art backlight unit includes a plurality of LED's for generating lights, and a printed circuit board (PCB) including a circuit for controlling an emission of the plurality of LED's 34. The LED 34 is a point light source that emits a red light, a green light and a blue light. The PCB 32 supports the LED 34 and controls an emission of the LED 34 by a circuit configured thereon. A light generated from the LED 34 is incident upon the first and second light guide plates 10 and 20 through the incidence faces of the first and second light guide plates 10 and 20.

The light propagated into the bottom and the side of the LED array 30 is reflected by the reflective sheet 12 to be progressed toward the output face. The light output via the first and second light guide plates 10 and 20 is incident, via the plurality of optical sheets 8, to the liquid crystal display panel 6.

The reflective sheet 12 is located at the rear side of the first light guide plate 10, and reflects a light incident thereto through the rear side of the first light guide plate 10 into the light guide plate 10, thereby reducing loss of light. In other words, when light from the LED 34 is incident onto the light guide plates 10 and 20, then light propagated toward the bottoms and the sides of the light guide plates 10 and 20 is reflected by the reflective sheet 12 toward the liquid crystal display panel 6.

The first and second light guide plates 10 and 20 convert a straight line of light input from the LED arrays 30a and 30b into a surface light to thereby guide the light into the liquid crystal display panel 6. The bottoms of the first and second light guide plates 10 and 20 include printed patterns 15 and 25. The printed patterns have a convex shape. The patterns are printed at positions separated by a desired distance from the incidence faces of the first and second light guide plates 10 and 20.

A light beam going through the light input part is reflected at a desired incline angle from the rear side provided with the printed patterns 15 and 25 to propagate uniformly toward the output face. The above-mentioned arrangement of the printed patterns insures that a distance "d" is adequate for combining red, green and blue lights emitted from the LED arrays 30a and 30b to generate white light.

A light incident onto the liquid crystal display panel 6 has a higher light efficiency when it forms a right angle. The plurality of optical sheets 8 vertically raises a light output from the first light guide plate 10 to thereby improve light efficiency. To this end, the liquid crystal display module includes a lower diffusing sheet for diffusing light output from the first and second light guide plates 10 and 20 into the entire area, first and second prism sheets for raising a propagation angle of the light diffused by the lower diffusing sheets vertically with respect to the liquid crystal display panel 6, and an upper diffusing sheet for diffusing light going through the first and second prism sheets. Thus, light output from the first and second light guide plates 10 and 20 is incident onto the liquid crystal display panel 6 via the plurality of optical sheets 8.

The top case 2 is shaped into a square band having a plane part and a side part, each of which is bent perpendicularly. The top case 2 encloses the edge of the liquid crystal display panel 6 and the main support 14.

Typically, the backlight unit is small, thin and lightweight. Accordingly, such LED arrays 30*a* and 30*b*, as shown in FIG. 2, are convenient light sources for a general backlight unit because of their low power consumption, thin shape, light weight and brightness, etc. as compared to a lamp.

The LED arrays 30*a* and 30*b* include a plurality of LED's 34*a* and 34*b* for generating lights 36*a* and 36*b*, respectively, and PCB's 32*a* and 32*b* mounted with a circuit controlling an emission of the plurality of LED's 34*a* and 34*b*, respectively. The plurality of LED's 34*a* and 34*b* are point light sources that emit a red light, a green light and a blue light. Such LED's 34*a* and 34*b* are arranged at the sides of the first and second light guide plates 10 and 20 to responsible for light sources.

The lights 36*a* and 36*b* generated from the plurality of LED's 34*a* and 34*b* are incident onto the first and second light guide plates 10 and 20 via the incidence faces of the first and second light guide plates 10 and 20. As mentioned above, since the plurality of LED's 34*a* and 34*b* generates red, green and blue lights, a desired distance "d" is required for combining the red, green and blue lights to convert them into a white light. For this reason, scattering patterns 15 and 25 provided at the first and second light guide plates 10 and 20 are formed at a desired distance "d" for combining red, green and blue lights emitted from the LED's 34*a* and 34*b* to convert them into a white light from the incidence faces of the first and second light guide plates 10 and 20.

The lights 36*a* and 36*b* emitted from the plurality of LED's 34*a* and 34*b* are scattered by the scattering patterns 15 and 25 provided at the first and second light guide plates 10 and 20 to have a propagation direction towards the liquid crystal display panel 6. If the plurality of LED's 34*a* and 34*b* emitting red, green and blue lights are used as light sources, then a partial area of the first and second light guide plates 10 and 20 is used as a region in which the red, green and blue lights are combined to be converted into a white light and the brightness of lights output from the first and second light guide plates 10 and 20 is scattered only at the remaining area.

In order to solve this problem, the first and the second light guide plates 10 and 20 are used to distribute uniformly a brightness of a light irradiated onto the liquid crystal display panel 6, as depicted in FIG. 2. In other words, a light 36*a* emitted from the LED 34*a* arranged at the side of the first light guide plate 10 is scattered by the scattering pattern 15 provided at the first light guide plate 10. A propagation direction of the scattered light 38*b* is changed towards the liquid crystal display panel 6.

The above-mentioned backlight unit of the liquid crystal display module suffers from the following drawbacks. The backlight unit has a large thickness "d1" because the light guide plates 10 and 20 are used to uniformly distribute the brightness. Thus, a weight of the backlight unit increases accordingly. Furthermore, a brightness of the light 38*a* output from the first light guide plate 10 is reduced accordingly because of the propagation through the second light guide plate 20. Such a brightness reduction phenomenon deteriorates the display quality of the liquid crystal display module 1.

Figure 4:
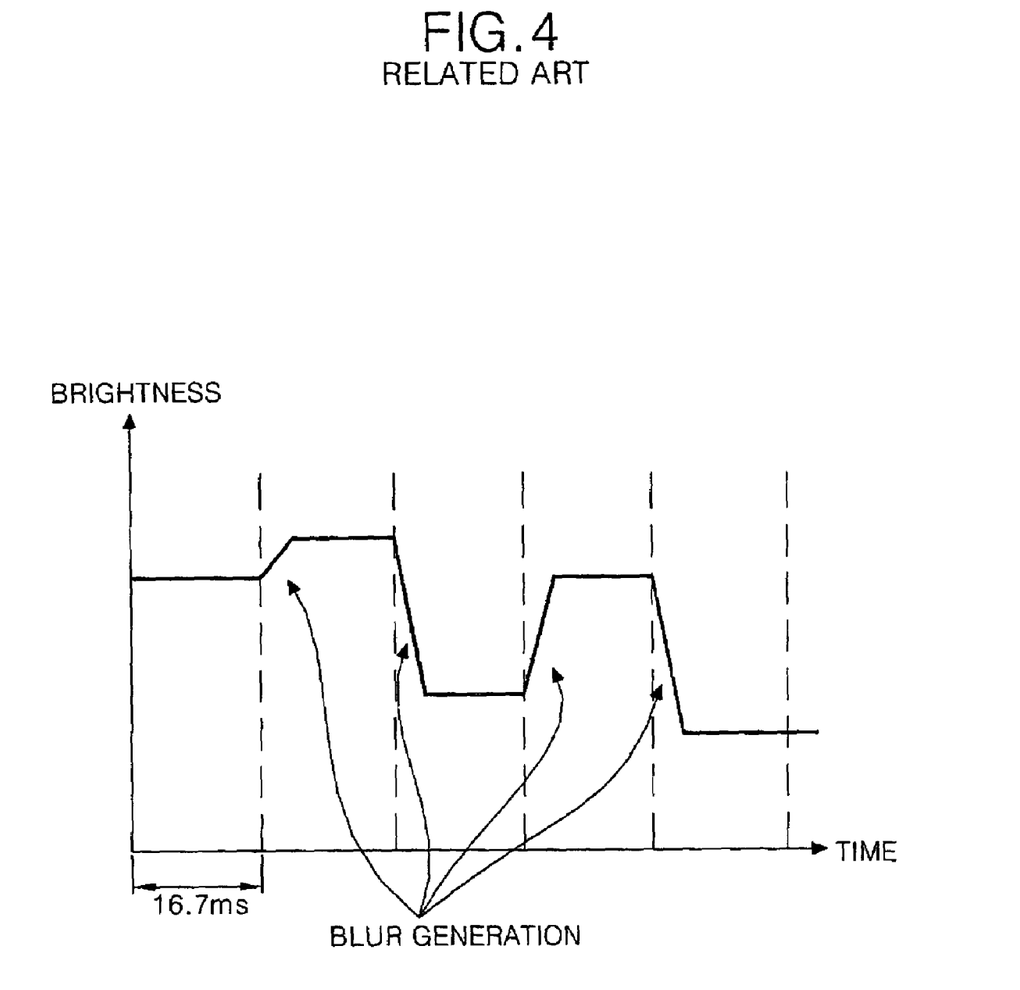
FIG. 4 is a graph depicting a blur phenomenon in the liquid crystal display module according to a hold-type driving of the light emitting diode shown in FIG. 3.

Moreover, the performance of above-mentioned backlight unit of the liquid crystal display module 1 is affected by the driving of a light source, for example LED 34, in a hold-type driving method. In the hold-type driving method, the light source is continuously turned on, thereby causing large power consumption. Hence, LED 34 dissipates heat, thus causing a reduction in the life the LED 34. In addition, the LCD suffers from a blur phenomenon due to such a hold-type driving of the LED 34. As depicted in FIG. 4, a picture becomes cloudy, thereby deteriorating the display quality of the liquid crystal display module 1.

SUMMARY OF THE INVENTION

Accordingly, the present invention is directed to a liquid crystal display module and a driving method thereof that substantially obviate one or more of the problems due to limitations and disadvantages of the related art.

An object of the present invention is to provide a liquid crystal display panel with a reduced thickness, a lower weight and an improved picture quality.

Another object of the present invention is to provide a method for driving a liquid crystal display panel having a reduced thickness, a lower weight and an improved picture quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, the liquid crystal display module includes a liquid crystal display panel, a light source for irradiating light onto the liquid crystal display panel, a diffuser for diffusing the light irradiated from the light source, and a plurality of holes provided at a rear side of the diffuser to insert a portion of the light source therein.

In another aspect, the liquid crystal display module includes a liquid crystal display panel, a light emitting diode array for irradiating a white light, and a diffuser for diffusing light irradiated from the light emitting diode array into the liquid crystal display panel.

In another aspect, the method of driving a liquid crystal display module, which includes a liquid crystal display panel, a light source for irradiating lights to the liquid crystal display panel, a diffuser for diffusing the lights input from the light source, and a plurality of holes provided at the rear side of the diffuser to insert a portion of the light source therein, includes turning on the light source during a desired time duration, and turning off the light source during a remaining time duration.

In another aspect, the method of driving a liquid crystal display module, which includes a liquid crystal display panel, a light emitting diode array for irradiating a white light and a diffuser for diffusing the light input from the light emitting diode array into the liquid crystal display panel, includes sequentially turning on light emitting diodes in accordance with a scanning direction of the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention. In the drawings.

DETAILED DESCRIPTION OF THE PREFERRED EMBODIMENT

Figure 5:
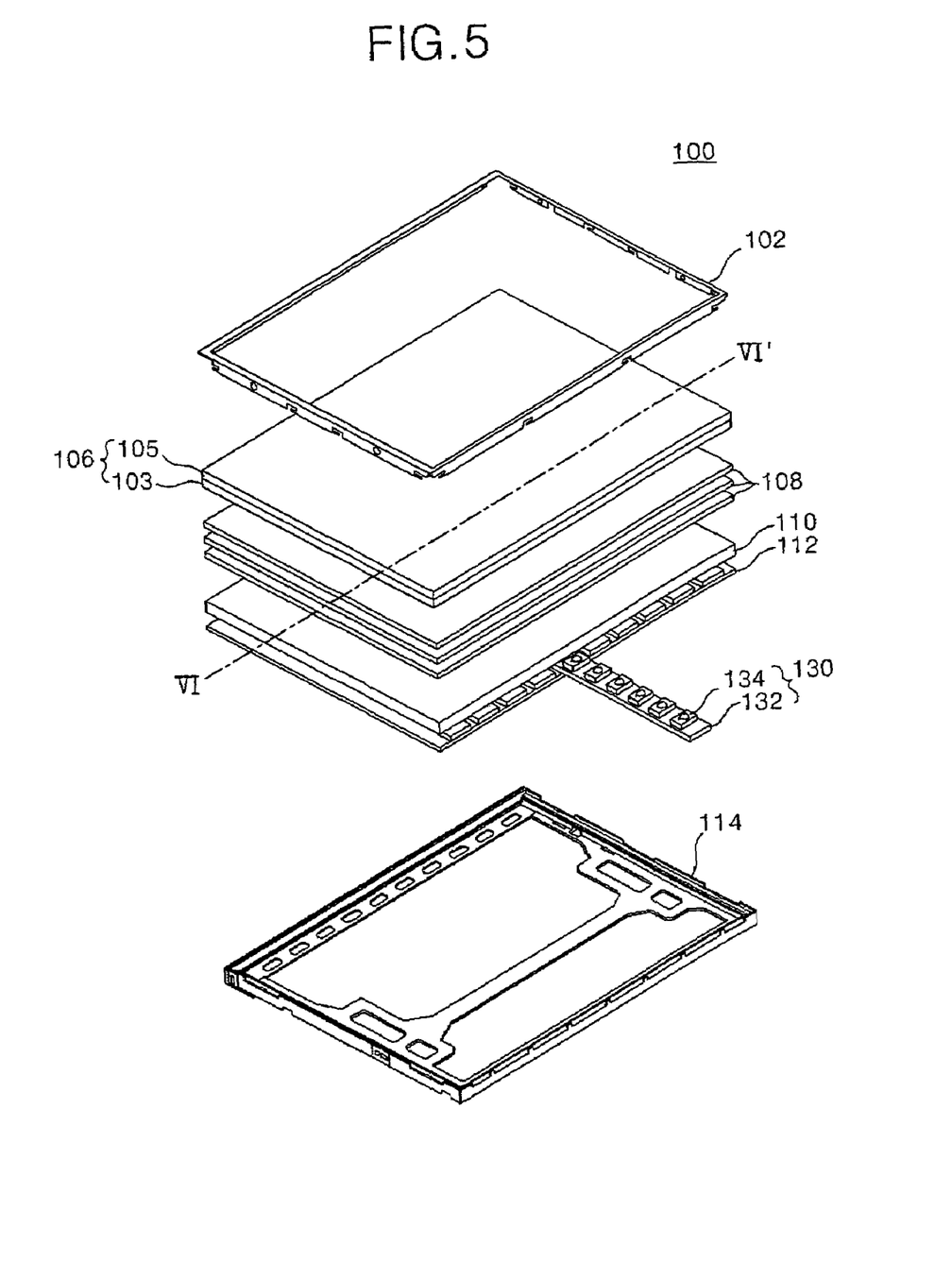
FIG. 5 is a perspective view of a structure of an exemplary liquid crystal display module according to a first embodiment of the present invention.
Figure 6:
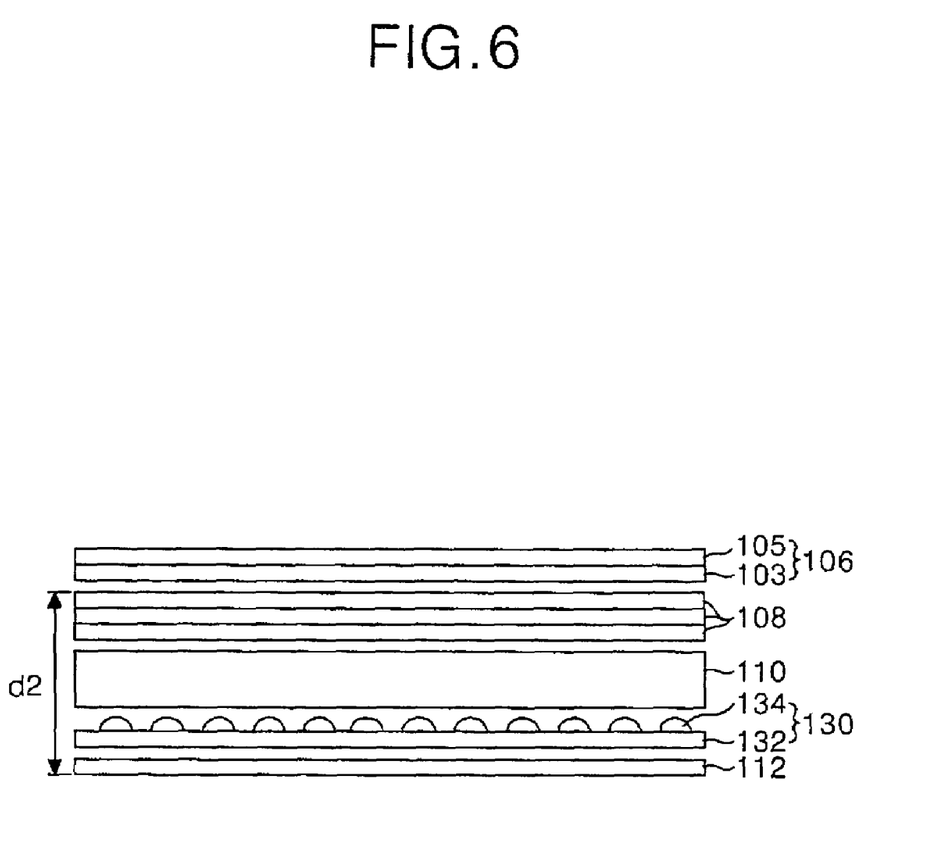
FIG. 6 is a section view of an exemplary liquid crystal display module taken along the VI-VI' line in FIG. 5.

FIG. 5 is a perspective view of a structure of an exemplary liquid crystal display module according to a first embodiment of the present invention. FIG. 6 is a section view of an exemplary liquid crystal display module taken along the VI-VI' line in FIG. 5.

Referring to FIG. 5 and FIG. 6, a liquid crystal display module according to the first embodiment of the present invention includes a main support 114, a backlight unit, a liquid crystal display panel 106 and a top case 102. The liquid crystal display panel 106 is disposed at an inside of the main support 114. The top case 102 encloses an edge of the liquid crystal display panel 106 and a side surface of the main support 114.

In the liquid crystal display panel 106, a liquid crystal is injected between an upper substrate 105 and the lower substrate 103. The liquid crystal display panel 106 is provided with a spacer (not shown) maintaining a constant gap between an upper substrate 105 and a lower substrate 103 of the liquid crystal display panel. The upper substrate 105 of the liquid crystal display panel 106 is provided with a color filter, a common electrode and a black matrix, etc. (not shown). A signal wiring such as a data line and a gate line, etc. (not shown) is formed at the lower substrate 103 of the liquid crystal display panel 106. A thin film transistor (TFT) (not shown) is formed at an intersection between the data line and the gate line. The TFT switches a data signal to be transmitted from the data line into the liquid crystal cell in response to a scanning pulse (i.e., a gate pulse) from the gate line. A pixel electrode (not shown) is formed at a pixel area between the data line and the gate line. One side of the lower substrate is provided with pad areas connected to the data lines and the gate lines. A tape carrier package (not shown), which includes a driver integrated circuit for applying a driving signal to the TFT, is attached onto the pad area. This tape carrier package applies data signals from the driver integrated circuit to the data lines. Also, the tape carrier package applies scanning signals to the gate lines.

An upper polarizing sheet is attached onto the upper substrate 105 of the liquid crystal display panel 106. A lower polarizing sheet is attached onto of the rear side of the lower substrate 103 of the liquid crystal display panel 106.

The main support 114 is a molded product. An inner side wall surface of the main support 114 is molded into a stepped coverage face. This stepped coverage face includes a securing part to which a plurality of optical sheets 108 is safely secured. A backlight unit, a diffusion plate 110, a reflective sheet 112, and a plurality of optical sheets 108 are disposed at the inner side layer of the main support 114. The backlight unit includes a light emitting diode (LED) array 130 for irradiating a light onto the liquid crystal display panel 106. The diffusion plate 110 diffuses a light input from the LED array 130 to irradiate the light onto the liquid crystal display panel 106. The reflective sheet 112 is disposed at a rear side of the LED array 130. The optical sheets 108 are disposed on the diffusion plate 110.

Figure 7:
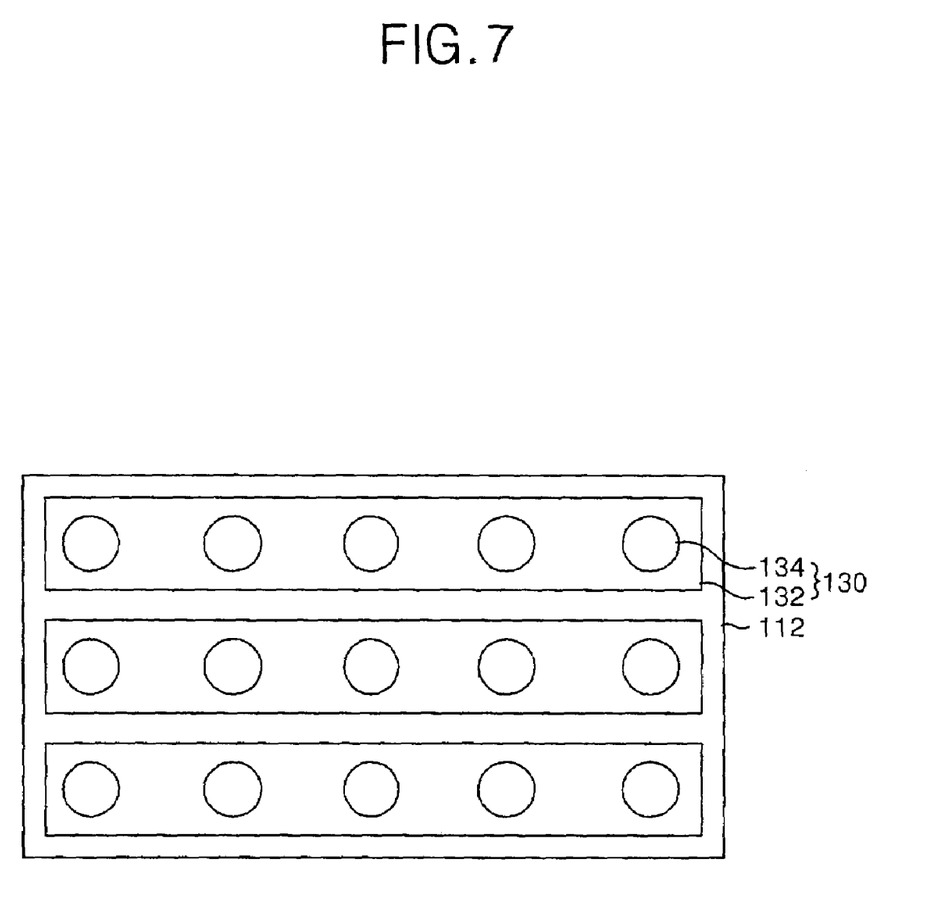
FIG. 7 is a plan view of an exemplary light emitting diode array according to the first embodiment of the present invention.

FIG. 7 is a plan view of an exemplary light emitting diode array according to the first embodiment of the present invention. As shown in FIG. 7, the LED array 130 of the liquid crystal display module 100 according to the first embodiment of the present invention includes a plurality of LED's 134 for generating lights, and a printed circuit board (PCB) 132 mounted with a circuit for controlling an emission of the plurality of LED's 134. The LED 134 is a point light source and which emits a white light. The PCB 132 supports the LED 134 and controls an emission of the LED 134 by a circuit configured thereon. A light generated from the LED 134 is incident onto the diffusion plate 110.

The diffusion plate 110 propagates a light input from the LED array 134 in a front direction of the liquid crystal display panel 106, and diffuses the light in such a manner to have a large range of uniform distribution. Thus, the diffusion plate irradiates light onto the liquid crystal display panel 106. A coating of light-diffusing member may be applied to both sides of the diffusing plate 110. The light-diffusing member may include a film made of a transparent resin.

The reflective sheet 112 is located at the rear side of the LED array 130. Light propagated toward the bottom of the LED array 130 is reflected by the reflective sheet 112 toward the output face, which is the liquid crystal display panel 106. Light output through the diffusion plate 110 is incident onto the liquid crystal display panel 106 via the plurality of optical sheets 108.

Light output from the diffusion plate 110 is diffused and has a large viewing angle. To this end, the optical sheets 108 are arranged on the diffusion plate 110. The plurality of optical sheets 108 vertically raises light output from the diffusion plate 110 to thereby improve light efficiency. Thus, the light output from the diffusion plate 110 is incident onto the liquid crystal display panel 106 through the plurality of optical sheets 108.

The top case 102 has a square band shape having a plane part and a side part, each of which is bent perpendicularly. The top case 102 encloses the edge of the liquid crystal display panel 106 and the main support 114.

In the liquid crystal display module 100 according to the first embodiment of the present invention, the LED array 130 is located at the rear side of the diffusion plate 110. The backlight unit consists of a single diffusion plate 110. Furthermore, it becomes possible to apply the LED array 130 emitting a white light, thereby reducing a gap between the diffusion plate 110 and the LED array 130. A thickness of the backlight unit also is reduced in accordance with the reduction of the gap between the diffusion plate 110 and the LED array 130. Specifically, the LED array 130 inherently emits a white light to thereby eliminate a requirement of the desired distance for combining the red, green and blue light to generate a white light.

Due to the above-mentioned structure, a thickness "d2" of the backlight unit of the liquid crystal display module 100 according to the first embodiment of the present invention is reduced compared to the thickness "d1" of the backlight unit of the related art liquid crystal display module 1.

The LCD suffers from a blur phenomenon in which a picture screen becomes cloudy when displaying a moving picture due to a slow response characteristic and a sustaining characteristic of the liquid crystal. It is difficult to completely overcome such a deterioration of picture quality in the moving picture even when a response speed of the liquid crystal is faster than one frame interval (i.e., 16.7 ms).

Figure 8:
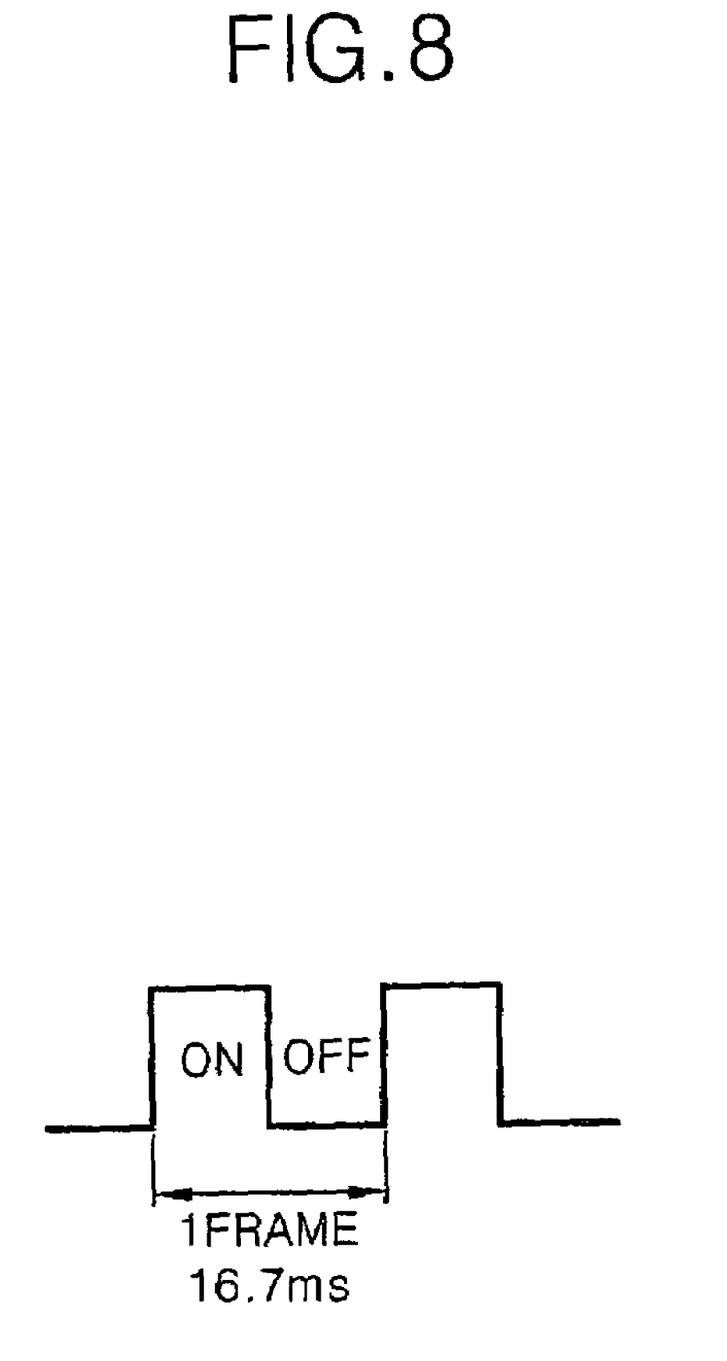
FIG. 8 is a waveform diagram representing an exemplary flashing driving method for driving the exemplary light emitting diode shown in FIG. 7.

FIG. 8 is a waveform diagram representing an exemplary flashing driving method for driving the light emitting diode shown in FIG. 7. Referring to FIG. 8, the liquid crystal display module 100 according to the first embodiment of the present invention drives the LED array 130 in a flashing method in order to prevent the blur phenomenon.

According to the flashing driving method, LED array 130 is driven during a certain time T1 of one frame interval to thereby turn on the LED 134. LED 134 remains off in the remaining time interval excluding the time T1. Thus, in the flashing driving method, the LED array 130 is driven in an impulse manner to eliminate the blur phenomenon.

If the LED 134 of the liquid crystal display module 100 according to the first embodiment of the present invention is driven in the flashing method, then heat generated from the LED 134 can be reduced. As the heat generated from the LED 134 is reduced, it becomes possible to prevent breakage of the LED caused by the heat and thus prevent a reduction in the life of the LED 134. Furthermore, if the LED 134 is driven in the flashing method, the previous field has no affect on the next field, thereby improving a display quality of the liquid crystal display module by preventing the blur phenomenon.

Figure 9:
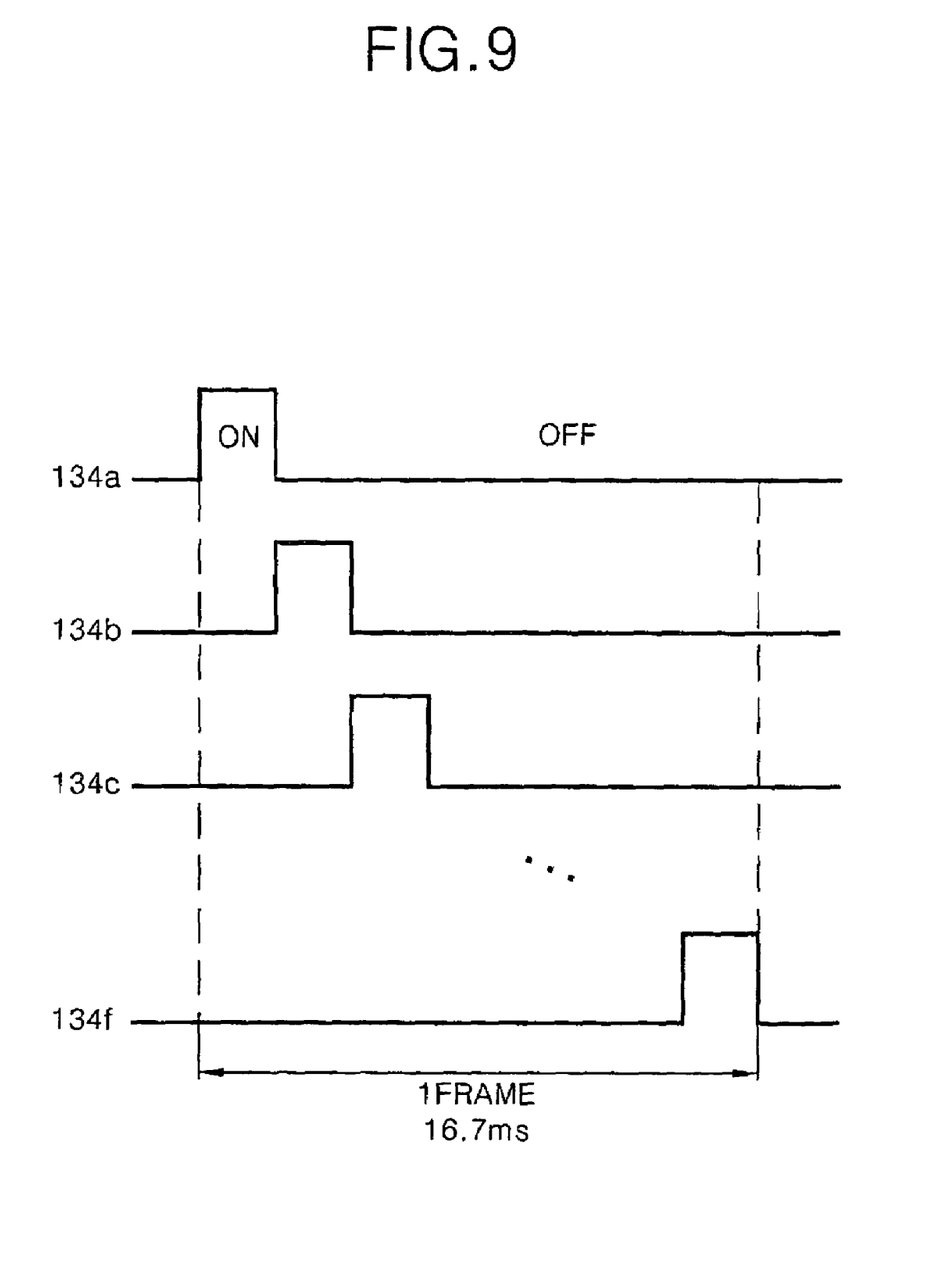
FIG. 9 is a waveform diagram of a scanning backlight driving method of the exemplary light emitting diode shown in FIG. 7.

FIG. 9 is a waveform diagram of a scanning backlight driving method of the light emitting diode shown in FIG. 7. Referring to FIG. 9, the liquid crystal display module 100 according to the first embodiment of the present invention drives the LED array 130 in the scanning backlight method in order to prevent the blur phenomenon. In the scanning backlight method, LED arrays 130a, 130b, 130c, 130d, 130e and 130f of the backlight unit are sequentially driven. More specifically, the LED's 134a to 134f are sequentially turned on in the scanning direction.

In accordance with the scanning backlight method, LED's 134a to 134f of the liquid crystal display module 100 are sequentially turned on and off to emit a light at an initial time of one frame interval while shutting off the light in the remaining time interval. Thus, LED's 134a to 134f of the liquid crystal display module 100 are driven in a quasi-impulse scheme. Accordingly, the scanning backlight method prevents the blur phenomenon by eliminating the effect of the previous field on the next field, thereby improving a display quality of the liquid crystal display module.

Figure 10:
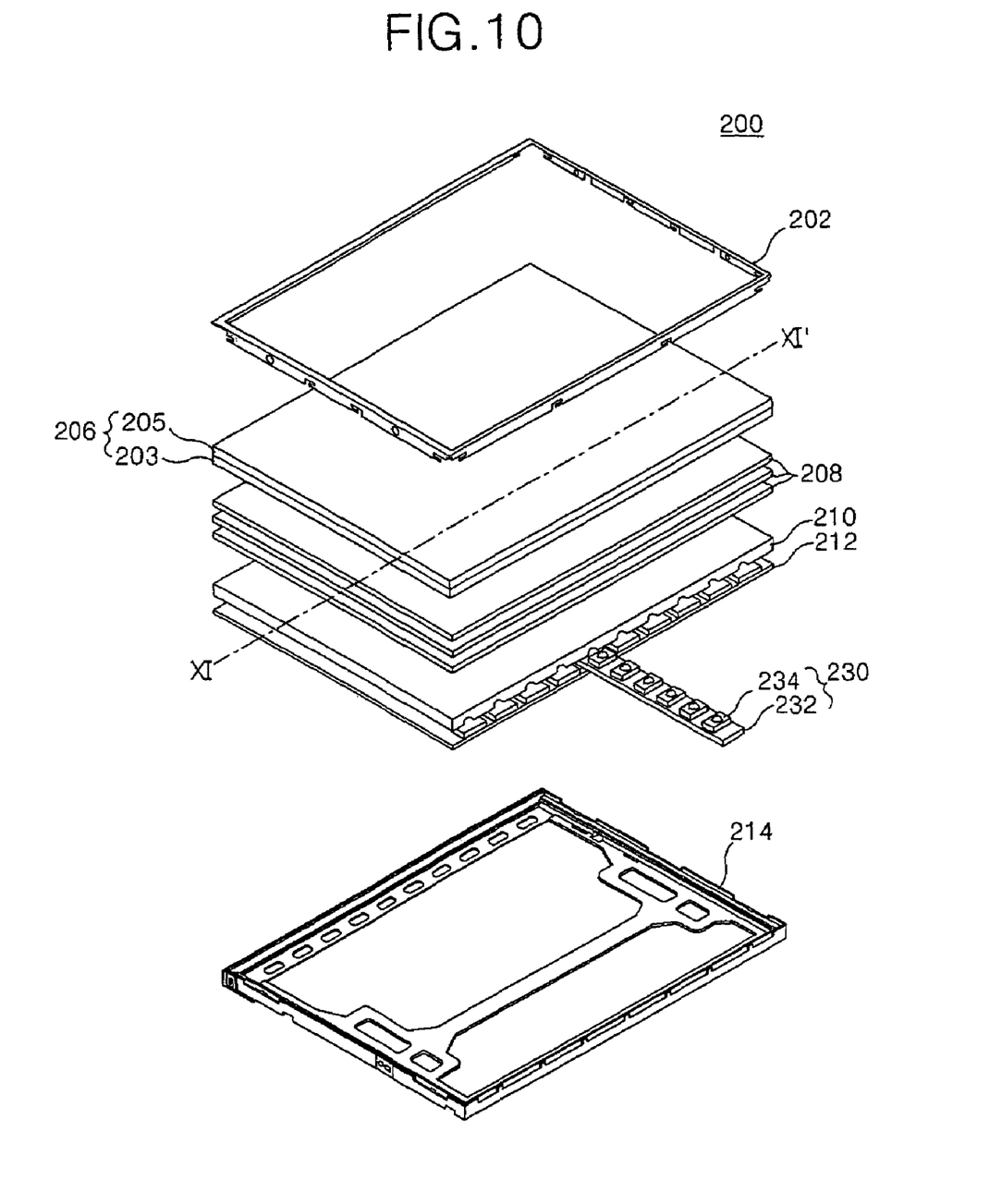
FIG. 10 is a perspective view of a structure of an exemplary liquid crystal display module according to a second embodiment of the present invention.
Figure 11:
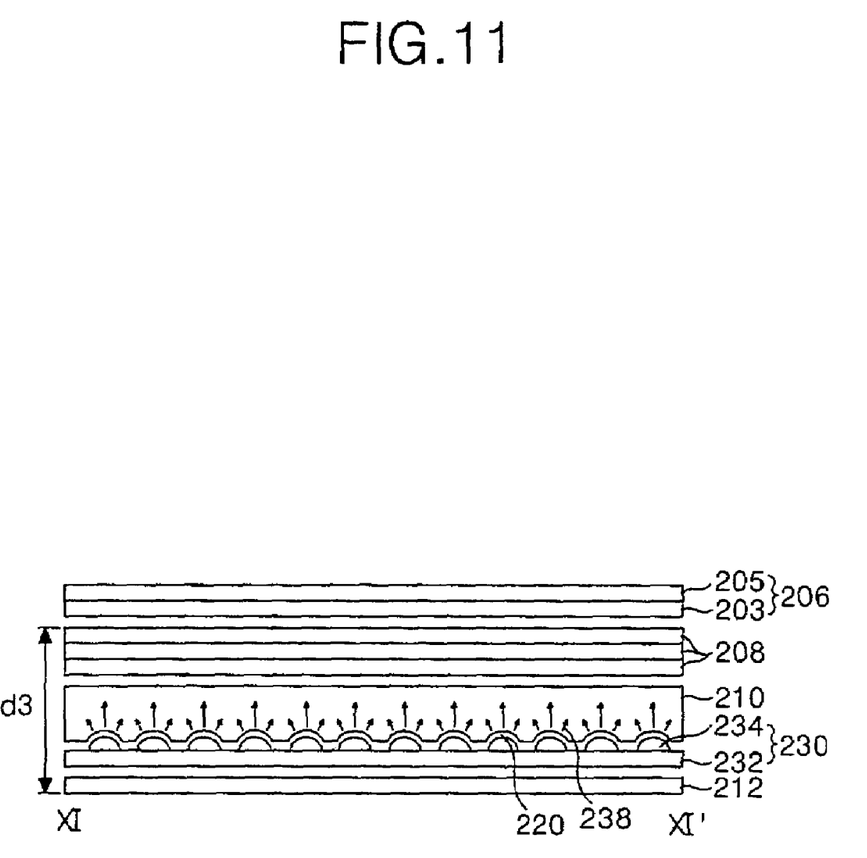
FIG. 11 is a section view of an exemplary liquid crystal display module taken along the XI-XI' line in FIG. 10.

FIG. 10 is a perspective view of a structure of an exemplary liquid crystal display module according to a second embodiment of the present invention. FIG. 11 is a section view of an exemplary liquid crystal display module taken along the XI-XI' line in FIG. 10. Referring to FIG. 10 and FIG. 11, a backlight unit of the liquid crystal display module 200 according to the second embodiment of the present invention includes a light emitting diode (LED) array 230, a diffusion plate 210, a reflective sheet 212 and a plurality of optical sheets 208. The light emitting diode (LED) array 230 irradiates a light onto the liquid crystal display panel 206. The diffusion plate 210 diffuses a light input from the LED array 230 and irradiates the diffused light onto the liquid crystal display panel 206. The reflective sheet 212 is disposed at the rear side of the LED array 230. The optical sheets 208 are disposed on the diffusion plate 210.

Figure 12:
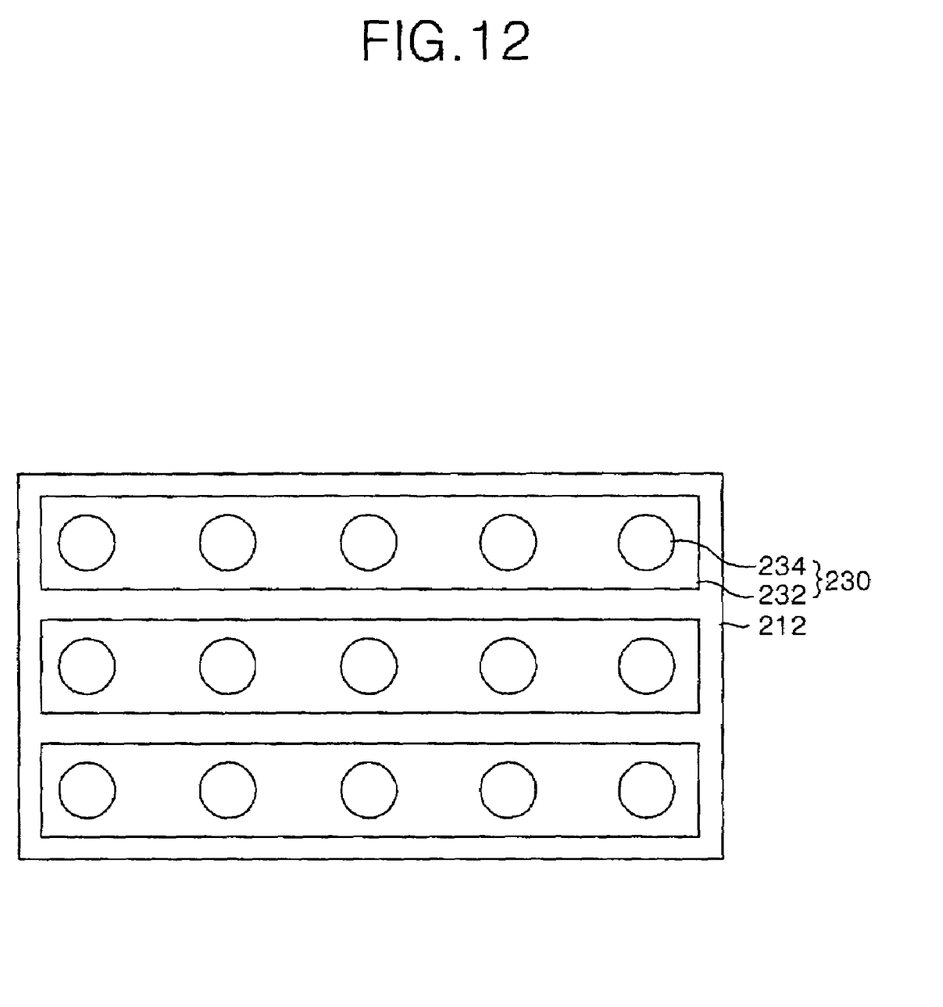
FIG. 12 is a plan view of an exemplary light emitting diode array according to the second embodiment of the present invention.

FIG. 12 is a plan view of an exemplary light emitting diode array according to the second embodiment of the present invention. As depicted in FIG. 12, the LED array 230 includes a plurality of LED's 234 for generating lights, and a printed circuit board (PCB) 232 including a circuit for controlling an emission of the plurality of LED's 234. The LED 234 is a point light source that emits a white light. The PCB 232 supports the LED 234 and controls an emission of the LED 234 by a circuit configured thereon. A light generated from the LED 234 is incident onto the diffusion plate 210.

The diffusion plate 210 transmits a light input from the LED array 230 in a front direction of the liquid crystal display panel 206, and diffuses the light in such a manner as to have a large range of uniform distribution, thereby irradiating light onto the liquid crystal display panel 206. A coating of a light-diffusing member may be applied to both sides of the diffusing plate 210. The light-diffusing member may include a film made of a transparent resin.

The reflective sheet 212 is located at the rear side of the LED array 230. A light propagated toward the bottom of the diffusion plate 210 is reflected by the reflective sheet 212 toward the output face, which includes the liquid crystal display panel 206. A light output via the diffusion plate 210 is incident onto the liquid crystal display panel 206 through the plurality of optical sheets 208.

A light output from the diffusion plate 210 is diffused and has a large viewing angle. The light incident onto the liquid crystal display panel 206 has a highest efficiency when it forms a right angle. To this end, the optical sheets 208 are arranged on the diffusion plate 210. The plurality of optical sheets 208 vertically raises a light output from the diffusion plate 210 to thereby improve the light efficiency. Thus, the light output from the diffusion plate 210 is incident onto the liquid crystal display panel 206 through the plurality of optical sheets 208.

In contrast with the above-mentioned related art liquid display device, the LED array 230, according to the second embodiment of the present invention, inherently emits a white light without a need for a desired distance to combine the red, green and blue light to generate a white light.

In the liquid crystal display module according to the second embodiment of the present invention, the LED array 230 is disposed at a rear side of a single of diffusion plate 210, thereby reducing a thickness of the backlight unit. Furthermore, the liquid crystal display module 200 according to the second embodiment of the present invention employs the emitting LED array 230, which reduces a gap between the diffusion plate 210 and the LED array 230.

FIG. 11 is a section view of an exemplary liquid crystal display module taken along the XI-XI' line in FIG. 10. In accordance with the second embodiment of the present invention, the liquid crystal display module 200 includes a plurality of holes 220 provided at the rear side of the diffusion plate 210. As shown in FIG. 11, a plurality of LED's 234 can be inserted into these holes in order to further reduce a thickness of the backlight unit.

Figure 13:
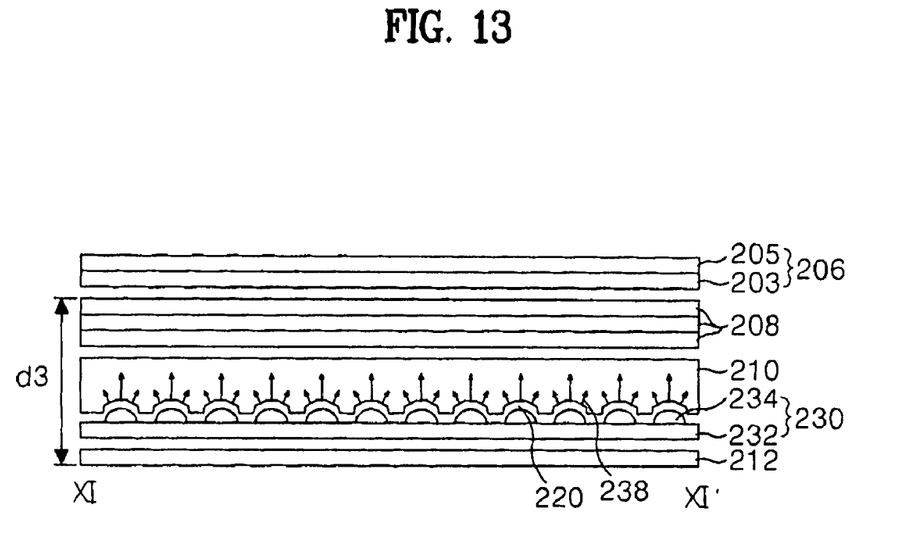
FIG. 13 is another section view of an exemplary liquid crystal display module taken along the XI-XI' line in FIG. 10.

A portion of the LEDs 234 arranged at the rear side of the diffusion plate 210 is inserted into the plurality of holes 220. In this case, the holes 220 are concave with a circular or polygonal shape as shown in FIGS. 11 and 13. Thus, an LED 234 is inserted into a hole 220 provided at the diffusion plate 210, thereby reducing a gap between the diffusion plate 210 and the LED array 230. Accordingly, a thickness of the backlight unit can be further reduced in the liquid crystal display module 200 according to the second embodiment of the present invention. Thus, a thickness "d3" of the backlight unit of the liquid crystal display module 200 is reduced compared to the thickness "d1" of the backlight unit of the related art liquid crystal display module 1.

Further, lights emitted from the LED 234 are scattered by the holes 220 provided at the diffusion plate 210. The lights are diffused across the entire area of the diffusion plate 210 in a uniform distribution due to the scattered lights 238. Thus, the backlight unit has a uniform brightness and the liquid crystal display module has an improved display quality.

The liquid crystal display module 200 according to the second embodiment of the present invention can be driven in the same flashing driving method or the same scanning backlight driving method as the liquid crystal display module 100 according to the first embodiment of the present invention in order to prevent the blur phenomenon.

As described above, the liquid crystal display module according to the present invention uses the LED array emitting a white light as a light source. The backlight unit consists of a single diffusion plate and is disposed at the rear side of the diffusion plate. In contrast with the related art LCD module, which uses two diffusion plates, the backlight unit of the LCD module according to the second embodiment of the present invention has a reduced thickness and a lower weight.

Furthermore, concave circular or polygonal holes are provided at the rear side of the diffusion plate such that the LED's can be inserted thereto, thereby reducing a thickness of the backlight unit. Moreover, the holes are provided at the diffusion plate to scatter a light emitted from the LED and then the scattered light is diffused through the diffusion plate, thereby presenting a uniform brightness and thus improving a display quality of the liquid crystal display module. In addition, the LED array is driven in the flashing method or the scanning backlight method, thereby reducing power consumption as well as eliminating the blur phenomenon to improve a display quality of the liquid crystal display module.

It will be apparent to those skilled in the art that various modifications and variations can be made in embodiments the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a liquid crystal display panel;
   a light source including a plurality of light emitters that irradiate light onto the liquid crystal display panel;
   a diffuser for diffusing the light irradiated from the light source; and
   a plurality of concave recesses provided at a rear side of the diffuser, each of the concave recesses receiving a portion of a light emitter of the plurality of light emitters therein,
   wherein a shape of each of the plurality of concave recesses is a polygonal shape.

2. The liquid crystal display module according to claim 1, wherein the plurality of light emitters include a light emitting diode array including a plurality of light emitting diodes.

3. The liquid crystal display module according to claim 2, wherein the light emitting diodes emit a white light.

4. The liquid crystal display module according to claim 2, wherein the light emitting diode array includes a printed circuit board comprising a circuit for controlling the light emitting diodes.

5. The liquid crystal display module according to claim 1, further comprising:
   a reflective sheet arranged at the rear side of the light source; and
   at least one optical sheet arranged on the diffuser.

6. A liquid crystal display module, comprising:
   a liquid crystal display panel;
   a light emitting diode array for irradiating a white light;
   a diffuser for diffusing light irradiated from the light emitting diode array into the liquid crystal display panel; and
   a plurality of concave recesses provided at a rear side of the diffuser, each of the concave recesses receiving a portion of a light emitting diode of the light emitting diode array,
   wherein a shape of each of the plurality of concave recesses is a polygonal shape.

7. The liquid crystal display module according to claim 6, wherein the light emitting diode array includes:
   a light emitting diode for generating the white light; and
   a printed circuit board including a circuit for controlling the light emitting diode.

8. The liquid crystal display module according to claim 6, further comprising:
   a reflective sheet arranged at the rear side of the light source; and
   at least one optical sheet arranged on the diffuser.

* * * * *